July 29, 1930.  A. E. EVANS  1,771,404
GLASS SURFACING APPARATUS
Filed June 25, 1928   6 Sheets-Sheet 3
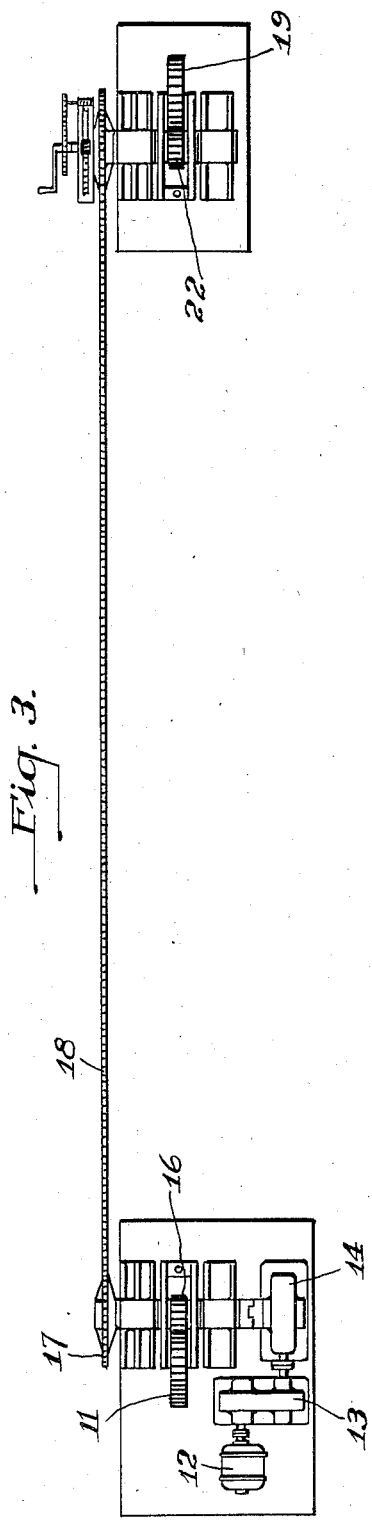
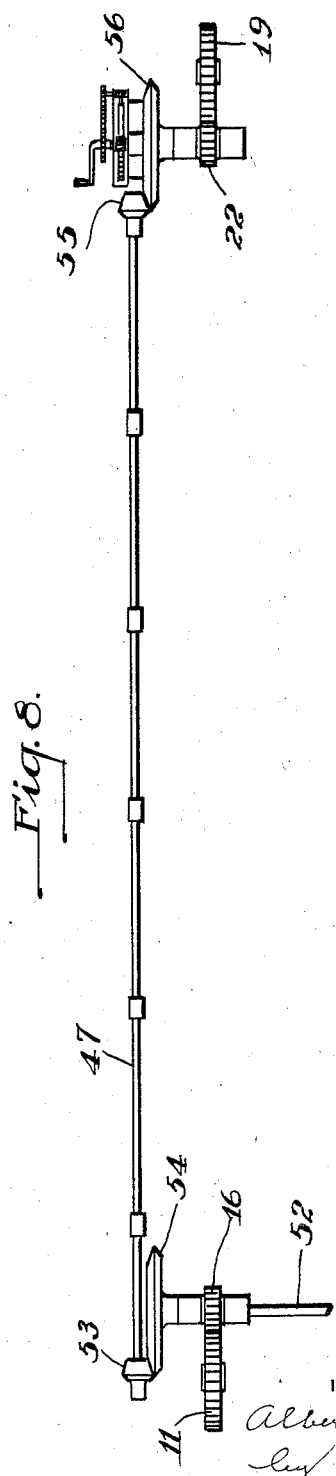
INVENTOR
Albert E. Evans
by
James L. Bradley
atty.

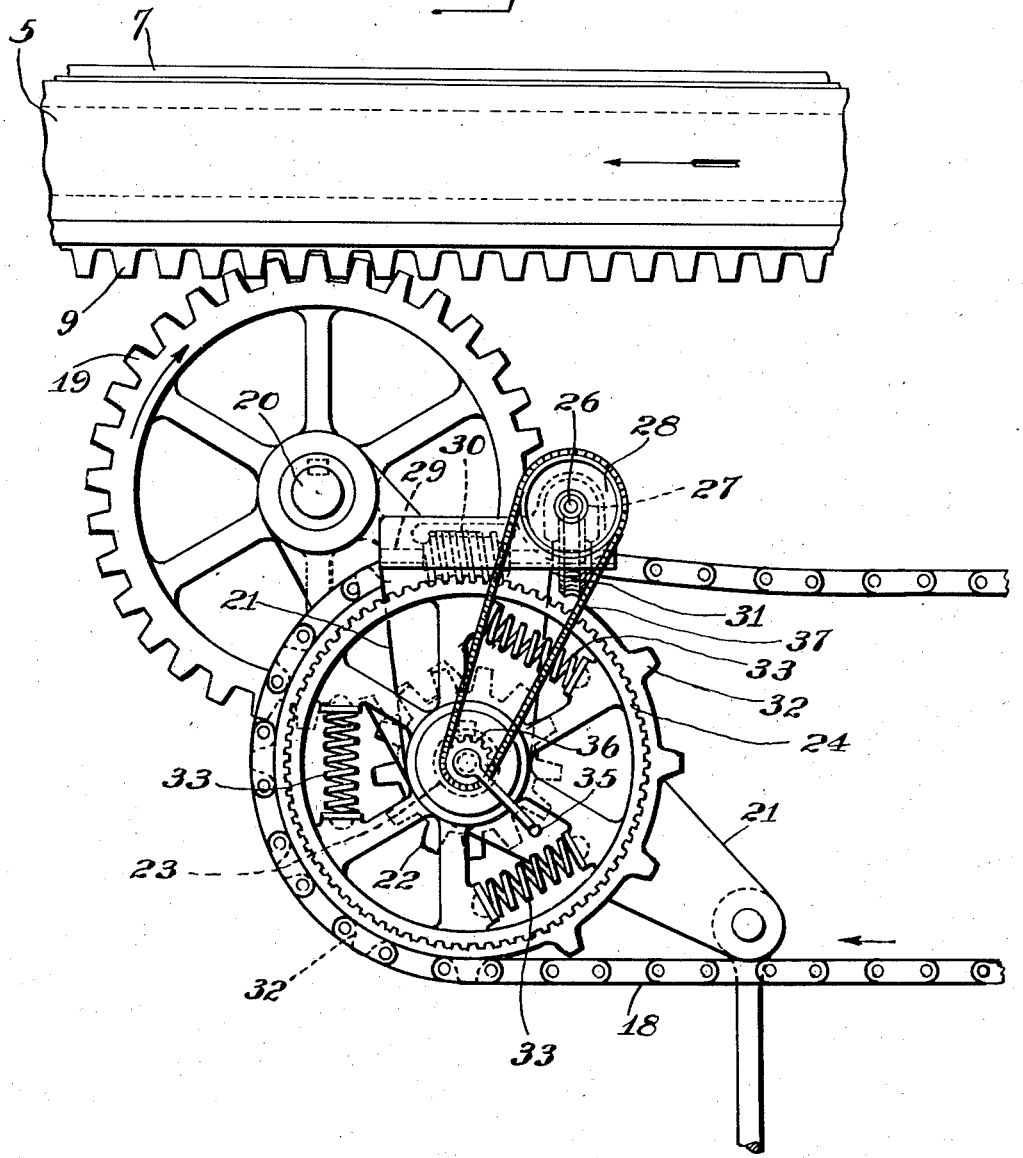

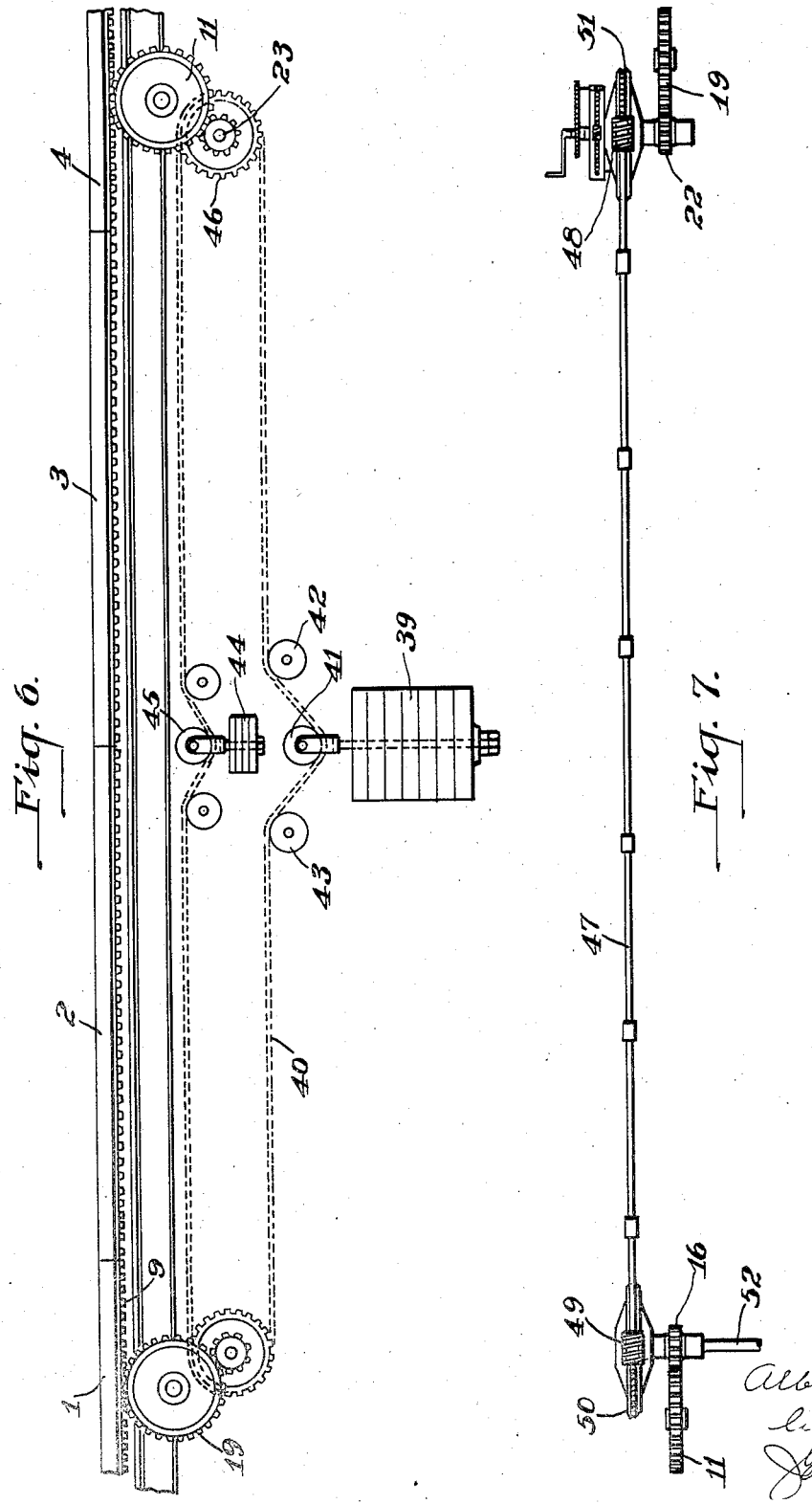

Patented July 29, 1930

1,771,404

UNITED STATES PATENT OFFICE

ALBERT E. EVANS, OF PITTSBURGH, PENNSYLVANIA, ASSIGNOR TO PITTSBURGH PLATE GLASS COMPANY, A CORPORATION OF PENNSYLVANIA

GLASS-SURFACING APPARATUS

Application filed June 25, 1928. Serial No. 288,226.

Figure 1:
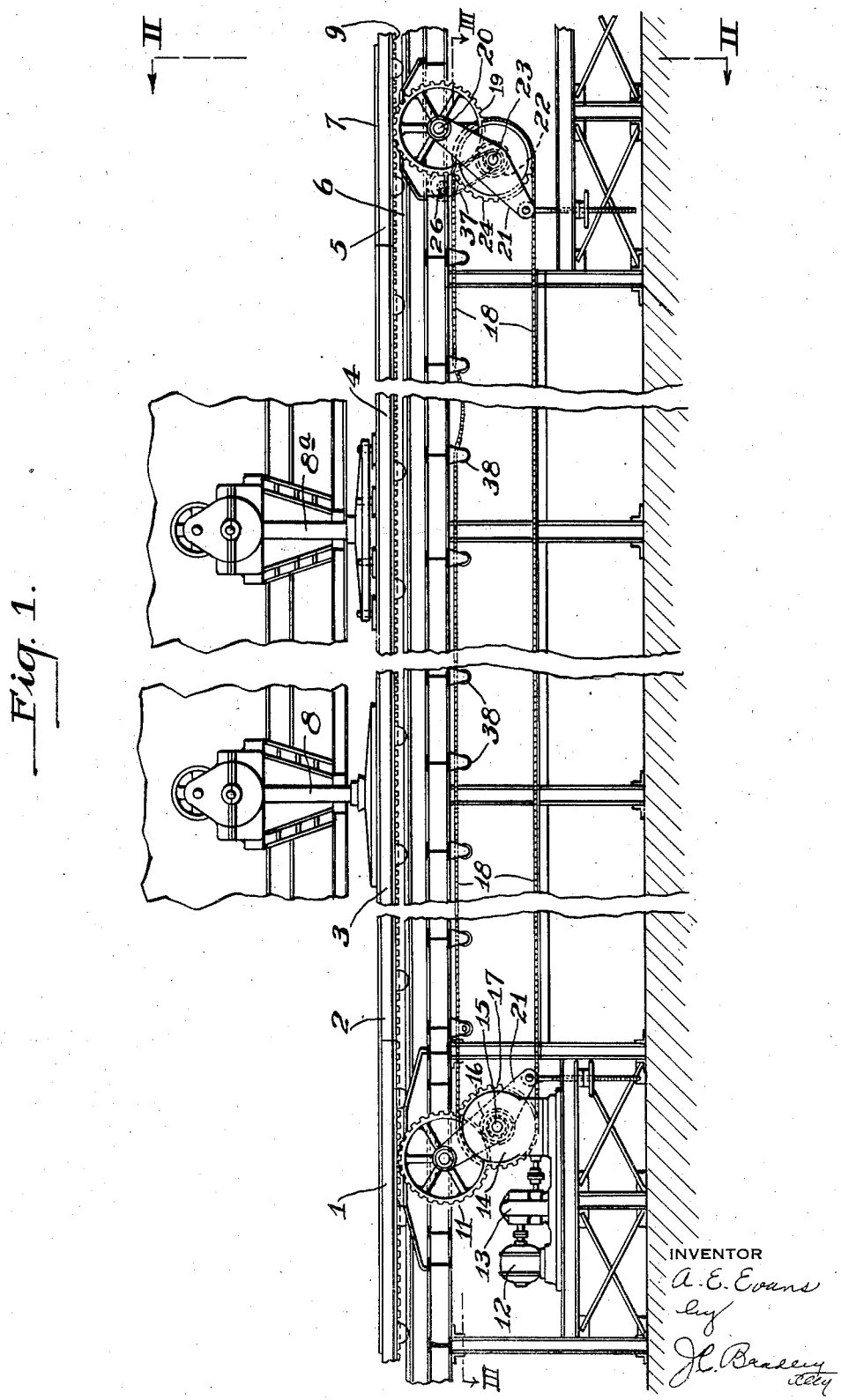
Figure 2:
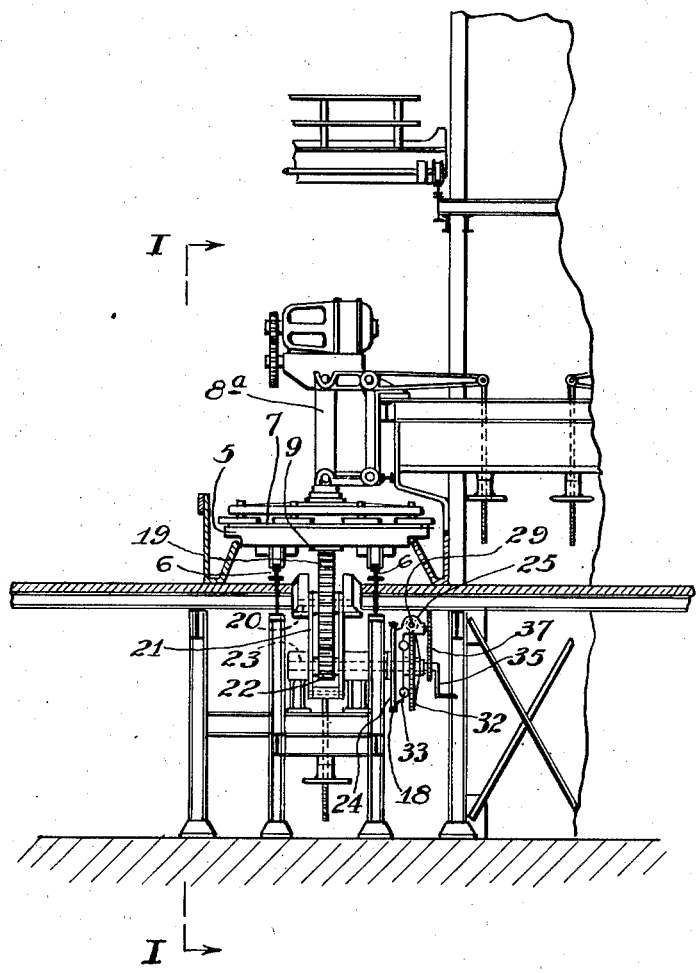
Figure 5:
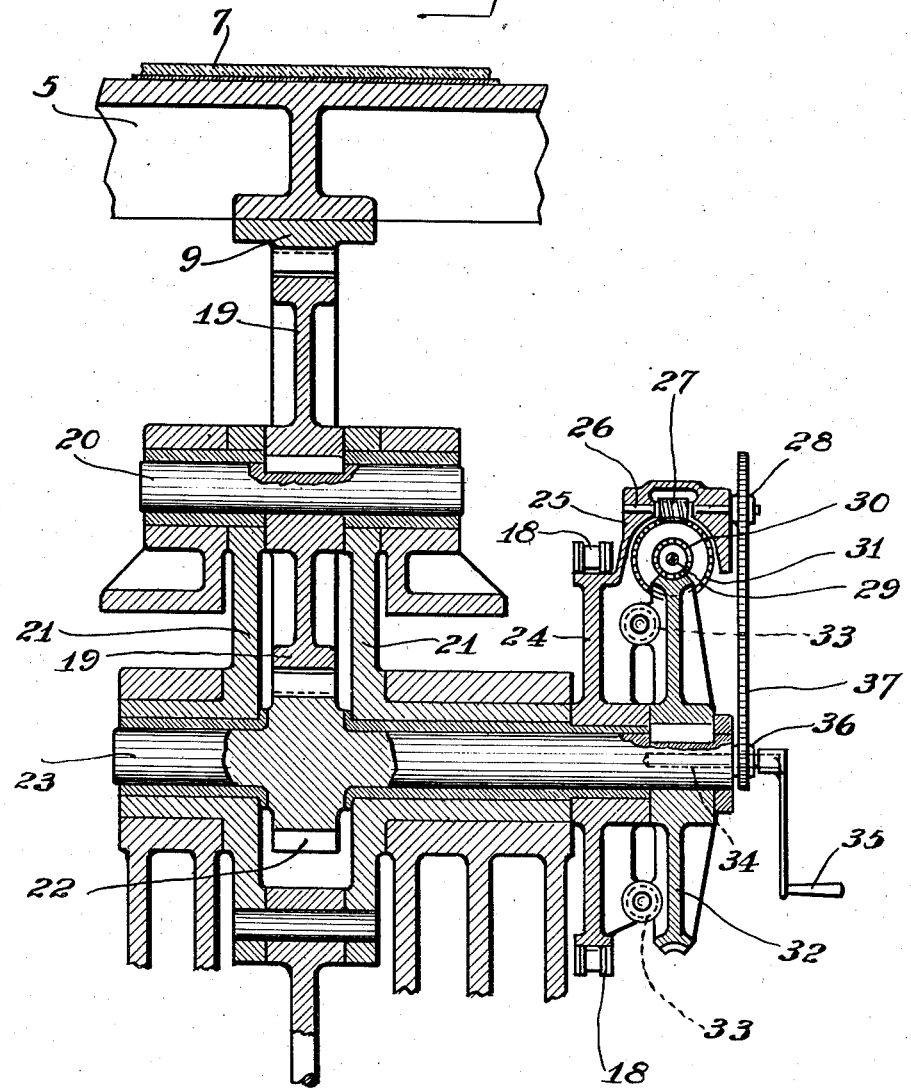

The invention relates to glass surfacing apparatus wherein the sheets of glass to be surfaced are carried beneath a series of grinding and polishing machines. It has for its principal objects the provision of improved means whereby the train of cars or trucks carrying the glass is placed under compression, thus insuring that the cars shall be kept in contact at their ends and doing away with the requirement for coupling devices, which are apt to become loosened and allow the cars to separate. This result has been accomplished heretofore by the use of a hold back at the front end of the train, including a friction brake, but such devices, while accomplishing the desired result, consume power, and require considerable adjustment and attention in order to maintain the braking or retarding force constant. The present construction is designed to reduce the power loss to a negligible point and to avoid any requirement for adjustment or attention except at remote intervals. Certain embodiments of the invention are illustrated in the accompanying drawings, wherein:

Figure 1 is a longitudinal section on the line I—I of Fig. 2 showing a part of the construction in side elevation. Fig. 2 is a section on the line II—II of Fig. 1. Fig. 3 is a plan view of the apparatus lying below the line III—III of Fig. 1. Fig. 4 is a detail side elevation of a part of the construction on an enlarged scale. Fig. 5 is a section through the portion of the construction shown in Fig. 4. And Figs. 6, 7 and 8 are diagrammatic views illustrating modifications.

In all of the constructions, the series of trucks or cars are moved continuously forward by a driven pinion engaging racks secured to the under sides of the truck bodies, such pinion being located at the rear end of the series. At the forward end of the series of trucks is a second pinion meshing with the racks and serving as a holdback whereby the trucks lying between the pinions are placed under compression. Connections are provided between the two pinions, including weight applying means or springs, whereby force is applied tending to rotate the pinions in opposite directions. The cars or trucks lying between the pinions resist this force so that the series is placed in compression, and their ends are held tightly in engagement. Since the force tending to rotate the pinions in opposite direction is applied equally to both, there is no lost energy (except that due to friction) incident to the use of the device, such as is the case where brakes, or the like, are used at the forward end of a train of trucks to provide a hold back, and thus place the cars under compression.

Referring to the drawings, 1, 2, 3, 4, 5, etc. are a series of cars or trucks mounted on the track 6 and carrying on their beds the glass sheets 7 to be ground and polished. Mounted along the line of travel of the trucks is a series of grinding machines 8 and polishing machines 8ª whose runners rest upon the surfaces of the glass sheets on the trucks. Secured to the lower sides of the trucks are the racks 9 by means of which the trucks are moved slowly forward as the surfacing progresses. A pinion 11 at the rear end of the series or train of trucks engages the racks 9 one after the other, as the trucks move along. This pinion is driven from the motor 12 through the intermediary of the reduction gearing in the casing 13, worm gearing including a worm wheel in the casing 14 on the shaft 15, and a pinion 16 on the shaft 15 which engages the pinion 11. Also mounted on the shaft 15 is a sprocket 17 around which passes the chain 18 constituting a part of the hold back or compression device, as later described.

At the forward end to the train of trucks is a second pinion 19 meshing with the racks 9 as they pass thereover, such pinion being mounted on the shaft 20 carried by the framework 21 beneath the trucks. The pinion 19 meshes with another gear 22 mounted directly beneath it and integral with the shaft 23 also journaled in the framework. Loose on the shaft 23 is the sprocket 24 around which passes the chain 18. This sprocket has integral with it a housing 25 carrying a transverse shaft 26 provided with a worm 27 and a sprocket 28. The housing also has journaled in it, at right angles to the shaft 26, a second shaft 29 provided with a worm 30 and a worm wheel 31, which latter meshes with the worm 27. The worm 30 meshes with a worm wheel 32 keyed to the shaft 23. The sprocket 24 and the worm wheel 32 are provided with three pairs of laterally projecting abutments, and between these abutments are the three compression springs 33, 33, 33, thus providing a yielding connection between such sprocket and the worm wheel. A small shaft 34 is journaled in the end of the shaft 23 and provided with a crank 35. The shaft 23 is also provided with a sprocket 36 around which, and the sprocket 28, passes the chain 37. By rotating the crank, the sprocket 24 is rotated relative to the worm wheel 32, placing the springs 33, 33, 33 under compression. The chain 18, which up until this time has not been in place, is now placed around the sprockets 17 and 24 and the springs 33, 33, 33, due to their compression tend to rotate the sprocket 24 in a counter clockwise direction, placing the lower flight of the chain 18 under tension. This tension in the lower flight of the chain tends to rotate the two sprockets 11 and 19, which engage the racks 9, in opposite directions; i. e., the pinion 11 in a clockwise direction and the pinion 19 in a counter clockwise direction. This places the trucks lying between the two pinions under compression, so that their ends are pressed tightly together as the train moves forward. The degree of compression is regulated by the amount of rotation which is given the crank 35, the worm gearing, including the two worms 27 and 30, acting as a lock so that the crank is maintained without other locking means in the position to which it is turned. The upper flight of the chain 18, which is relatively slack, as indicated in Fig. 1, is supported by a series of rollers 38.

Fig. 6 illustrates a modification in which the spring tension means 33, 33, 33 of Figs. 1 to 5 are omitted, and the weights 39 are employed to secure the necessary tension in the chain 40, which corresponds to the chain 18 of the Figs. 1 to 5 construction. The weights are carried by the pulley 41 lying between the fixed pulleys 42 and 43. A weight 44 hanging from the pulley 45 serves to take up the slack in the upper flight of the chain, but this weight is relatively slight and not in any way essential to the performance of the apparatus. The rest of the apparatus corresponds to that of the Figs. 1 to 5 construction, except that the springs 33 are omitted. The rotation of the sprocket 46 relative to the shaft 23 does not vary the tension in the lower flight of the chain in this Fig. 6 construction, but is useful in adjusting the lower flight to bring the weights to the proper height when the device is adjusted to cooperative relation with the train of cars. Other lifting means might be provided for the weights 39 in adjusting the apparatus before starting. The tension in the lower flight of the chain 40 may be adjusted by adding to the weights 39 or removing a part thereof. The weights 39 perform the function of the springs 33, 33, 33 of Figs. 1 to 5, and tend to turn the pinions 11 and 19 in opposite directions, thus applying compression to the series of trucks or cars lying therebetween. As in the other construction, the tension in the lower flight of the chain tends to rotate the pinion 19 in a clockwise direction and the pinion 11 in a counter clockwise direction. This Fig. 6 construction has the advantage that the weight tensioning means will act to take up an indefinite amount of elongation in the chain 18 without involving any substantial modification in the degree of tension and without calling for any adjustments, such as are required in any spring tensioning device wherein the tension decreases as the chain elongates.

Fig. 7 illustrates a further modification, in which the shaft 47 takes the place of the chain of the Figs. 1 to 5 construction. This shaft has at its ends the worms 48 and 49 meshing with the worm wheels 50 and 51 which take the place of the sprockets 17 and 24 of the Figs. 1 to 5 construction, the worm wheel 50 being keyed to the shaft 52 corresponding to the shaft 15 of Fig. 1, and the gear 51 being loose on a shaft corresponding to the shaft 23 of Figs. 1 and 5. In other particulars, the construction is the same as that of Figs. 1 to 5.

The construction of Fig. 8 is the same as that of Fig. 7 except that the bevel gears 53 and 54 take the place of the worm gearing 49, 50 and the gears 55 and 56 take the place of the worm gearing 48, 51, the other parts being identical and being similarly numbered. Various other arrangements of gear connections are possible, the only requirement being the insertion in the line of connections between the pinions 11 and 19 of tension means tending to rotate the pinions in opposite directions and place the trucks between the two pinions in comparison. In both of the constructions employing the shaft 47 instead of the chain, the torsion of the shaft performs to a greater or less degree the function of the springs 33 (Fig. 4), as these shafts are several hundred feet long and may, without exceeding the elastic limit of the steel, be given several complete turns, thus providing a powerful spring in the shaft itself, which has sufficient range of movement to carry out the desired function.

What I claim is:

1. In sheet glass surfacing apparatus, a plurality of trucks adapted to carry a series of sheets to be surfaced, racks carried by said trucks, pinions at the front and rear ends of said plurality of trucks engaging said racks, power means for driving the rear pinion, and yielding connections between the pinions tending to rotate the front pinion rearwardly so that pinion acts as a yielding hold back for the truck whose rack it engages.

2. In sheet glass surfacing apparatus, a plurality of trucks adapted to carry a series of sheets to be surfaced, racks carried by said trucks, pinions at the front and rear ends of said plurality of trucks engaging said racks, power means for driving the rear pinion, and yielding connections between the pinions tending to rotate the front pinion rearwardly and the rear pinion forwardly and placing the trucks lying between the pinions under compression.

3. In sheet glass surfacing apparatus, a plurality of trucks adapted to carry a series of sheets to be surfaced, racks carried by said trucks, pinions at the front and rear ends of said plurality of trucks engaging said racks, power means for driving the rear pinion, yielding connections between the pinions tending to rotate the front pinion rearwardly and the rear pinion forwardly and placing the trucks between the pinions under compression, and means for adjusting the stress placed upon said yielding connections.

4. In sheet glass surfacing apparatus, a plurality of trucks adapted to carry a series of sheets to be surfaced, racks carried by said trucks, pinions at the front and rear ends of said plurality of trucks engaging said racks, power means for driving the rear pinion, and yielding connections between the pinions tending to rotate them in opposite directions, so that the trucks lying between the pinions are placed under compression.

5. In sheet glass surfacing apparatus, a plurality of trucks adapted to carry a series of sheets to be surfaced, racks carried by said trucks, pinions at the front and rear ends of said plurality of trucks engaging said racks power means for driving the rear pinion, and yielding connections between the pinions tending to rotate them in opposite directions, so that the trucks lying between the pinions are placed under compression, said connections including a pair of sprockets, an endless chain passing around the sprockets, and spring means tending to rotate one of the sprockets.

In testimony whereof, I have hereunto subscribed my name this 21st day of June, 1928.

ALBERT E. EVANS.